US011453084B2

(12) United States Patent
Kubisch et al.

(10) Patent No.: US 11,453,084 B2
(45) Date of Patent: Sep. 27, 2022

(54) LASER PROCESSING HEAD FOR LASER-WIRE BUILD-UP WELDING

(71) Applicant: FRAUNHOFER-GESELLSCHAFT ZUR FOERDERUNG DER ANGEWANDTEN FORSCHUNG E.V., Munich (DE)

(72) Inventors: Frank Kubisch, Borna (DE); Sebastian Thieme, Ottendorf-Okrilla (DE); Holger Hillig, Bad Gottleuba (DE); Sebastian Schueler, Berlin (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 86 days.

(21) Appl. No.: 16/971,316

(22) PCT Filed: Feb. 5, 2019

(86) PCT No.: PCT/EP2019/052744
§ 371 (c)(1),
(2) Date: Aug. 20, 2020

(87) PCT Pub. No.: WO2019/162079
PCT Pub. Date: Aug. 29, 2019

(65) Prior Publication Data
US 2021/0008662 A1    Jan. 14, 2021

(30) Foreign Application Priority Data
Feb. 23, 2018    (DE) ............. 10 2018 202 797.8

(51) Int. Cl.
*B23K 26/14*    (2014.01)
*B23K 26/342*    (2014.01)
(Continued)

(52) U.S. Cl.
CPC ...... *B23K 26/1476* (2013.01); *B23K 26/0643* (2013.01); *B23K 26/0652* (2013.01); *B23K 26/16* (2013.01); *B23K 26/342* (2015.10)

(58) Field of Classification Search
CPC ............ B23K 26/1476; B23K 2101/16; B23K 2101/18; B23K 2103/42; B23K 2103/50;
(Continued)

(56) References Cited

U.S. PATENT DOCUMENTS 4,315,130 A * 2/1982 Inagaki ............. B23K 26/0608
148/DIG. 93
4,572,941 A * 2/1986 Sciaky .............. B23K 26/0608
219/121.75
(Continued)

FOREIGN PATENT DOCUMENTS

| CN | 202367348 | 8/2012 |
|---|---|---|
| CN | 106312304 | 1/2017 |

(Continued)

OTHER PUBLICATIONS

English translation of CN 202367348 U (Year: 2011).*
International Search Report.
German Examination Report.

*Primary Examiner* — Chris Q Liu
(74) *Attorney, Agent, or Firm* — Jacobson Holman PLLC

(57) ABSTRACT

A laser beam is directed onto a pyramid-shaped element, wherein the beam is directed onto at least three reflecting surfaces and the respective reflected partial beams are incident on reflecting surfaces arranged on an optics carrier element. The partial beams are aligned such that they intersect in a common plane. An internal wire feed is arranged in a housing, having an outlet nozzle for a fusible wire-shaped material, which material is using the energy of the partial beams. The outlet nozzle is arranged in front of the plane in which the reflected partial beams intersect. The
(Continued)

pyramid-shaped element and the reflecting surfaces are formed on a carrier element, which is arranged in such a way that it is displaceable following the outlet nozzle in two perpendicular directions to the optical axis of the laser beam or perpendicular to the central longitudinal axis of the wire-shaped material.

11 Claims, 5 Drawing Sheets

(51) Int. Cl.
*B23K 26/06* (2014.01)
*B23K 26/16* (2006.01)

(58) Field of Classification Search
CPC .. B23K 26/0608; B23K 26/067; B23K 26/14; B23K 26/142; B23K 26/22; B23K 26/244; B23K 26/36; B23K 26/38; B23K 26/073; B23K 26/08; B23K 26/1436; B23K 26/16; B23K 26/26

USPC .............. 219/121.74, 121.75, 121.85, 121.6, 219/121.61, 121.63, 121.64, 121.73, 219/121.77, 121.78, 121.8
See application file for complete search history.

(56) References Cited

U.S. PATENT DOCUMENTS

| 6,058,132 | A | * | 5/2000 | Iso | ........................ | B23K 26/066 |
| | | | | | | 372/15 |
| 2013/0335504 | A1 | * | 12/2013 | Sandstrom | .......... | G03F 7/70816 |
| | | | | | | 347/246 |
| 2021/0197318 | A1 | * | 7/2021 | Ma | ........................ | B23K 26/342 |

FOREIGN PATENT DOCUMENTS

| CN | 106392314 | 2/2017 |
| CN | 106583726 | 4/2017 |
| CN | 107227455 | 10/2017 |
| CN | 107322166 | 11/2017 |
| CN | 107414305 | 12/2017 |
| DE | 102009038659 | 3/2011 |
| DE | 102009039650 | 3/2011 |
| JP | 2001314985 | 11/2001 |

* cited by examiner

LASER PROCESSING HEAD FOR LASER-WIRE BUILD-UP WELDING

BACKGROUND OF THE INVENTION

The invention relates to a laser processing head which is formed for laser wire build-up welding. Using the laser processing head, different wire-shaped materials, in particular wires with outer diameters of less than 1.6 mm, preferably of less than 1 mm and generally of less than 0.6 mm, can be processed. In this way, coatings or three-dimensional contours on workpiece surfaces, as well as additive manufacturing of three-dimensional workpieces or components, can be realized.

Laser processing heads of said type are known. In doing so, it is often a goal to achieve a central wire feed and fusing by means of the energy of a laser beam in as homogeneous a form as possible. For this purpose, laser radiation must be directed radially from the outside onto a centrally positioned and conveyed wire-shaped material in order to fuse said material as homogeneously as possible.

For this purpose, a laser beam is directed onto beam-deflecting reflecting elements, such that a reflected individual beam or a plurality of reflected partial beams are reflected in the direction of a plane in which an intersection of the reflected laser radiation results. The wire-shaped material should be conveyed into this plane and fused there. This plane is arranged above the surface of a workpiece, on which surface material is to be applied by means of laser wire build-up welding.

The laser beam is usually emitted by a laser radiation source and introduced into an optical unit by way of an optical fiber. There the beam is incident on the laser beam reflecting elements, as described above, and is then reflected by a plurality of partial beams into the plane with the intersection. In doing so, the wire-shaped material ought to be fed centrally in relation to the partial beams striking a common intersection, in order to ensure a homogeneous heating and an optimal material utilization.

So far, this has been realized in such a way that the alignment of the laser beam, and, in doing so, that of the optical fiber in particular, is adjusted in relation to the reflecting elements.

In doing so, this results in a considerable outlay since an optical adjustment must be carried out at a plurality of positions and elements of a laser processing head that are separate from one another. In particular, the alignment of the laser beam and in particular of an optical fiber is problematic and prone to errors during the operation or when put into operation again.

In CN 107 322 166 A, CN 107 414 305 A, CN 106 583 726 A and CN 106 392 314 A, such laser processing heads for build-up welding are known, in which partial beams of a laser beam with reflecting elements are used for build-up welding.

CN 202 367 348 U differs from these known technical solutions in that a ring-shaped mirror is used.

From DE 10 2009 038 659 A1, an upper emission extraction system for laser processing systems has been known.

SUMMARY OF THE INVENTION

It is therefore an object of the invention to provide possibilities for a simplified and safe optical adjustment of a laser beam in relation to the fed wire-shaped material, even during continuous operation.

According to the invention, this object is achieved by a laser processing head having the features of the claims.

In the laser processing head according to the invention, a laser beam 6 is directed through an optical unit 4 onto a pyramid-shaped element 8 and in doing so onto at least three reflecting surfaces of the pyramid-shaped element 8.1 which are aligned at equal angular distances from each other. The respective partial beams 6.1, 6.2, 6.3 reflected by the reflecting surfaces 8.1 are incident on reflecting surfaces 8.2 arranged radially on the outside of a carrier element. In doing so, the reflecting surfaces 8.1, 8.2 are aligned such that the partial beams 6.1, 6.2, 6.3 reflected at them are aligned such that they intersect in a common plane 6.4.

An internal wire feed 2 is arranged in the housing 1, said feed having an outlet nozzle 2.1, arranged in the direction of a workpiece to be processed, for a wire-shaped material 3, which material is fusible using the energy of the partial beams 6.1, 6.2, 6.3 incident on the wire-shaped material 3. In doing so, the outlet nozzle 2.1 is arranged in the feed movement of the wire-shaped material 3 in front of the plane in which the reflected partial beams intersect 6.4.

The pyramid-shaped element 8 and the reflecting surfaces 8.1, 8.2 are formed on a single optics carrier element 5.1. The optics carrier element 5.1 is arranged and fixable in the optical adjustment means 5 in such a way that it is displaceable following the outlet nozzle 2.1 perpendicular to the optical axis of the laser beam 6 or perpendicular to the central longitudinal axis of the wire-shaped material 3 for an adjustment.

Thus, the optics carrier element 5.1 can be displaced in axes (x- and y-axis of a Cartesian coordinate system) aligned perpendicular to one another for an optical adjustment 5 of the partial beams 6.1, 6.2, 6.3 and can be locked in the desired position.

On account thereof, the essential adjustment of the optical system is reduced to the optical adjustment 5 of a single one, namely the optics carrier element 5.1.

The pyramid-shaped element 8 should be arranged on the optics carrier element 5.1 in such a way that said pyramid's apex is arranged in the center between the reflecting surfaces 8.1. On account thereof, with exact adjustment of the optics carrier element 5.1, it can be ensured that the partial beams 6.1, 6.2, 6.3 reflected by the reflecting surfaces of the pyramid-shaped element 8.1 have the same energy with the same beam cross-sectional areas of the partial beams.

The optics carrier element 5.1 should be a monolith which is made of a single material. Here, no individual part present at the optics carrier element 5.1 should have been attached to the optics carrier element 5.1 as a result of assembly. In doing so, an optics carrier element 5.1 may have been integrally produced from a semi-finished product by machining and/or an additive manufacturing process.

An optics carrier element 5.1 should preferably be made of copper or a copper alloy.

At least one cooling channel 8.4 and cooling grooves 8.5 are formed at or in the optics carrier element 5.1, which are connectable to a feed and discharge for a cooling medium. On account thereof, distortion at different operating temperatures can be largely compensated for. The at least one cooling channel 8.4 can also be formed directly at or in the optics carrier element 5.1 and, if necessary, sealed from the surroundings by means of a seal. A seal can be arranged between the open cooling channel 8.4 or openings in the cooling channel 8.5 and the assembly unit 14, the protective glass module (16) and the housing.

The optics carrier element 5.1 can be adjustable in the two axes which are aligned perpendicularly to one another by means of two adjusting elements 5.2 provided with a thread which are perpendicular to one another. In the simplest case, these adjusting elements 5.2 can be adjusted manually. However, a motorized drive can also be used for the translational movement of the optics carrier element 5.1 in the plane. Depending on the lead of the thread, the accuracy of the optical adjustment 5 can be increased. Thus threads with a very short lead lead to high positioning and adjustment accuracy. Such threads also have a high level of self-locking, and so an additional locking option can be dispensed with. Furthermore, the adjusting elements 5.2 are securely lockable against each other in the respective XY axis. Thread leads of 0.2 are preferred.

A plurality of external wire feeds 10, 11, 12, 13 can preferably be present for feeding different wire materials 3 and can be arranged outside the housing 1. A wire-shaped material 3 can be fed from each of the external wire feeds 10, 11, 12, 13 to the internal wire feed 2, wherein a funnel-shaped inlet opening 2.2 for the introduction of a wire-shaped material 3 from one of the external wire feeds 10, 11, 12, 13 into the internal wire feed 2 should be formed at the end side opposite the outlet nozzle 2.1.

External wire feeds 10, 11, 12, 13 can be provided with a motorized drive which can realize the feed movement of the respective wire-shaped material 3. A device for avoiding twisting of the wire-shaped material 3 fed from a roll can advantageously also be present at the external wire feeds 10, 11, 12, 13.

Wire-shaped material 3 can be conveyed from an external wire feed 10, 11, 12, 13 into the funnel-shaped area 2.2 of the internal wire feed 2 and from there through the internal wire feed 2 to the outlet nozzle 2.1 into the area in which the partial beams intersect 6.4. In doing so, the conveyance takes place within the housing 1 in such a way that between the external wire feed 10, 11, 12, 13 and the outlet nozzle 2.1 the wire-shaped material 3 cannot be adversely affected by laser radiation 6. This can be achieved by positioning 5 the wire-shaped material 3 within the housing, in which the partial beams 6.1, 6.2, 6.3 are guided through areas 14.2 in which no wire-shaped material 3 can come into contact with the partial beams 6.1, 6.2, 6.3.

A smoke extractor 9 can advantageously be present at the housing 1 at the end side facing a workpiece. The smoke extractor 9 can be formed with a cone 9.7 which can be screwed to the housing. In the direction of the workpiece, an opening through which the reflected partial beams 6.1, 6.2, 6.3 and a wire-shaped material 3 can exit should be present at such a cone 9.7. A protective gas should also be directed through this opening onto the workpiece area to be processed.

The smoke extractor 9, in particular a cone, should be formed with a plurality of perforations 9.2 arranged over the outer circumference, which open in a common extraction channel 9.1. In doing so, the sum of the free cross-sectional areas of the perforations 9.2 through which smoke is extracted from the processing area of the respective workpiece should correspond to the free cross-sectional area of the common extraction channel 9.1. However, the sum of the free cross-sectional areas of the perforations 9.2 can be at most 10% larger or smaller than the free cross-sectional area of the extraction channel 9.1, in order to ensure sufficient effective extraction of smoke from the processing area.

The nozzle-shaped element 9.7 of the smoke extractor 9, which is fastenable to the housing 1, can be formed with at least one cooling channel 9.3 which is connectable to a feed and a discharge 9.4, 9.5 for a cooling medium. In this case, the feed and discharge 9.4, 9.5 can be guided through the extraction channel 9.1 to or from outside the assembly unit 14 and the housing 1. In doing so, the required cross-sectional area in the interior of the extraction channel 9.1 accordingly take into account the sum of the free cross-sectional areas of the perforations 9.2 of the free cross-sectional area of the extraction channel 9.1, under consideration of the loss of free cross-sectional area corresponding to the feed and discharge 9.4, 9.5 for a cooling medium into the at least one cooling channel 9.3 at the smoke extractor 9.

The internal wire feed 2 and in particular the outlet nozzle 2.1 should also be displaceable and lockable perpendicular to the plane in which the optics carrier element 5.1 is displaceable and adjustable in two dimensions, for a defined positioning 15 in relation to the plane in which the reflected partial beams intersect 6.4. On account thereof, an exact positioning 15 in the Z-axis direction of the wire-shaped material 3 that reaches the area of influence of the intersecting reflected partial beams 6.1, 6.2, 6.3 can be achieved. This can be achieved, for example, with a groove and feather key solution 2.3. On account thereof, the internal wire feed 2 can be positioned in the Z-axis direction by translational displacement and, if necessary, can be fixed in a desired position by means of a locking mechanism, for example a screw.

BRIEF DESCRIPTION OF THE DRAWINGS

The invention will be explained in greater detail by way of example below.

In the figures.

DETAILED DESCRIPTION OF THE INVENTION

Figure 1A:
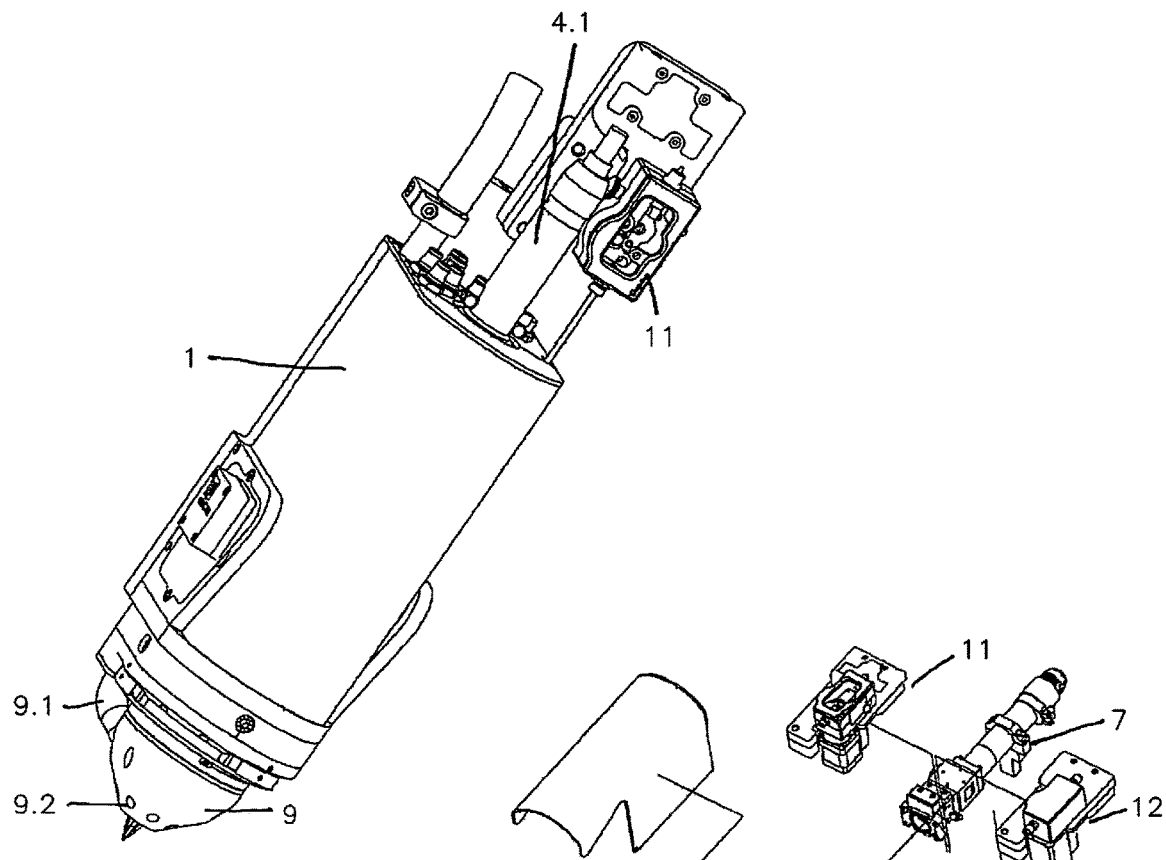
FIG. 1 consists of FIGS. 1A and 1B which show a perspective and an exploded illustration of an example of a laser processing head according to the invention.
Figure 1B:
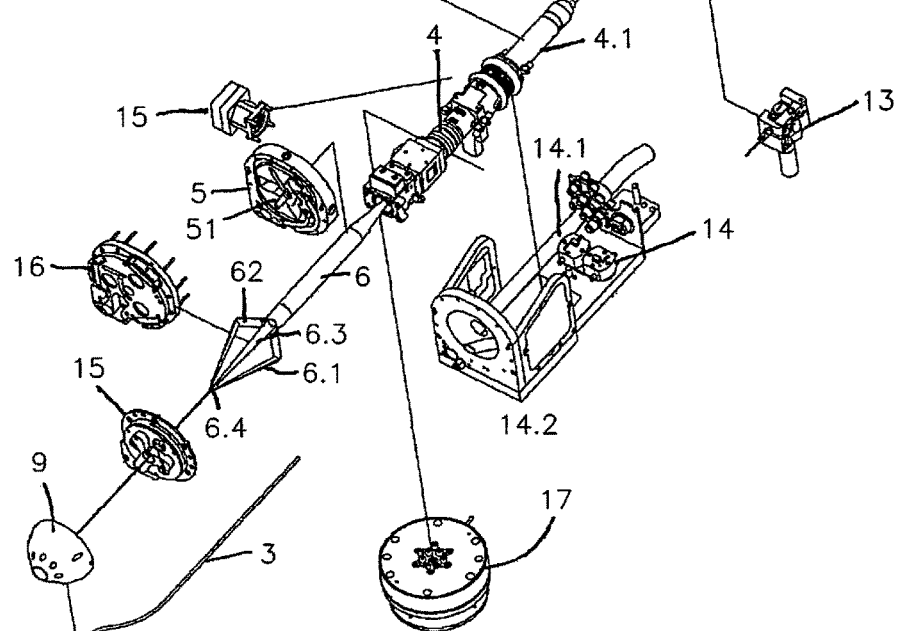

In FIGS. 1A and 1B, an example of a laser processing head according to the invention is shown. Here, an internal wire feed 2 for feeding wire-shaped material 3, optical components 4 for shaping a laser beam 6, and an optics carrier element 5.1 for deflecting the laser beam 6 and splitting the laser beam into three partial beams 6.1-6.3 are arranged in a housing 1.

An optical unit 4 for an optical fiber 4.1 is fastened to the housing 1, through which unit the laser beam 6 is directed onto reflecting surfaces 8.1 of a pyramid-shaped element 8 and reflecting surfaces 8.2 that are formed at an optics carrier element 5.1.

At the opposite end side of the laser processing head, a smoke extractor 9 is present, having a screw-on cone 9.7 with an opening through which the wire-shaped material 3 can be fed into the area of influence of the partial beams 6.1-6.3 intersecting in a plane, in the direction of a workpiece, not shown. A extraction channel 9.1 is present at the cone 9.7, which is connected on the suction side to a unit that achieves negative pressure, not shown. The smoke extracted through the extraction channel 9.1 can be guided to a filter unit, also not shown.

In the housing 1, between the optics carrier element 5.1 and the smoke extractor 9, there is a protective glass module 16 with at least one, in this example three, protective glasses, through which the three partial beams 6.1-6.3 propagate in the direction of the plane in which they intersect 6.4 and the other components contained in the housing 1, in particular the optical components 4 and the optics carrier element 5.1, can be protected from contamination by said protective glasses. The protective glass module 16 and/or the protective glasses should be replaceable.

Furthermore, an XYZ wire adjustment means 15 for adjusting the wire-shaped material 3 to the intersection of the three partial beams 6.4 and an assembly unit 14 are present at the laser processing head. Various external wire drives 10, 11, 12, 13, other optical units from other laser manufacturers 7 and a collision and safety shutdown 17 can also be installed.

Figure 2A:
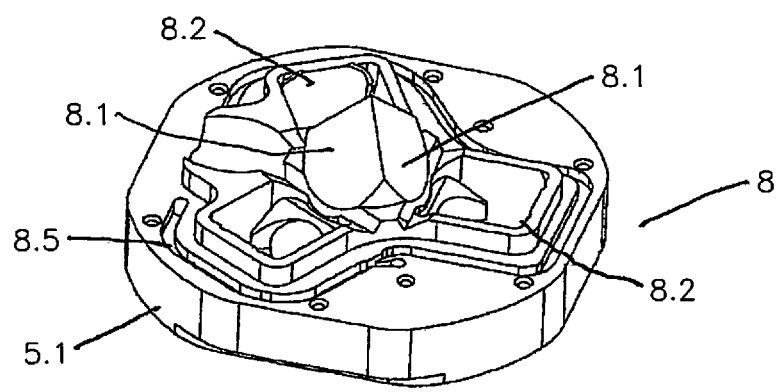
FIG. 2 consists of FIGS. 2A and 2B which show two illustrations of an optics carrier element that can be used in the invention.
Figure 2B:
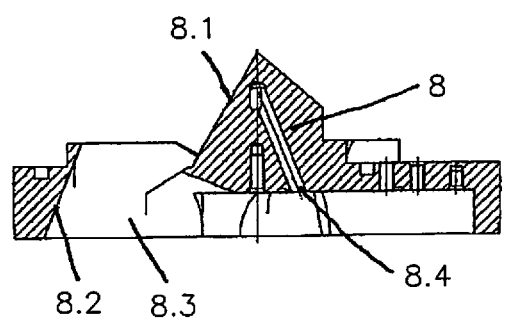

FIG. 2A shows a perspective illustration of an optics carrier element 5.1. The optics carrier element 5.1 is formed in such a way that the apex of a pyramid-shaped element 8 is arranged in the center. The laser beam 6 focused by the optical components is incident on the apex and the three reflecting surfaces 8.1 which adjoin and are inclined at an angle. The three reflecting surfaces 8.1 of the pyramid-shaped element 8 are aligned and arranged with respect to one another in such a way that the incident laser beam 6 is split into three partial beams 6.1-6.3 and each partial beam 6.1-6.3 is incident on one reflecting surface 8.2 formed at the optics carrier element 5.1. The reflecting surfaces 8.2 are aligned in such a way that the partial beams 6.1-6.3 are each reflected through an opening 8.3 in the optics carrier element 5.1 at an angle directed obliquely toward one other in the direction of a workpiece to be processed. In doing so, the reflections take place in such a way that the partial beams 6.1-6.3 intersect in a plane that is arranged above the surface to be processed on a workpiece, and there wire-shaped material 3 is also fed from the outlet nozzle 2.1. Furthermore, it can be seen in FIG. 2B that a cooling channel 8.4 and cooling grooves 8.5 are formed in the optics carrier element 5.1, through which a cooling medium, in particular cooling water, for cooling can be passed.

In doing so, the opening in the smoke extractor 9 is selected to be so large that, in addition to the outlet nozzle 2.1 of the internal wire feed 2, the partial beams 6.1-6.3 can also pass through this opening without any problems.

The optics carrier element 5.1 is made of copper or a copper alloy and has been produced as one piece by machining.

The optics carrier element 5.1 is guided in a guide carriage (optical adjustment means) 5, which is likewise fastened in the housing 1. In doing so, the optics carrier element 5.1 and guide carriage 5 are aligned perpendicular to the optical axis of the laser beam 6. The optics carrier element 5.1 can be displaced in two dimensions in this plane oriented perpendicular to the optical axis of the laser beam 6 and thus be adjusted in relation to the optical axis, in particular with its reflecting surfaces 8.1 formed at the pyramid-shaped element 8, and therefore also necessarily with the reflecting surfaces 8.2. For this purpose, two adjusting elements 5.2 can be used, which are aligned at a right angle to each other and provided with a thread, and with which the optical adjustment means 5 can respectively be displaced in one axial direction, preferably in the X or Y axis direction, for adjustment and can be locked against one another.

Figure 3A:
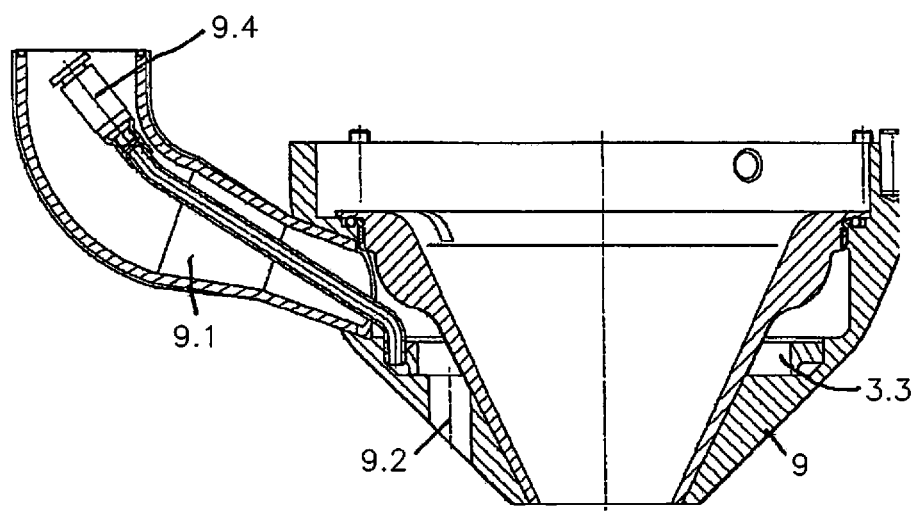
FIG. 3 consists of FIGS. 3A, 3B, and 3C which show three illustrations of a smoke extractor at a laser processing head.
Figure 3B:
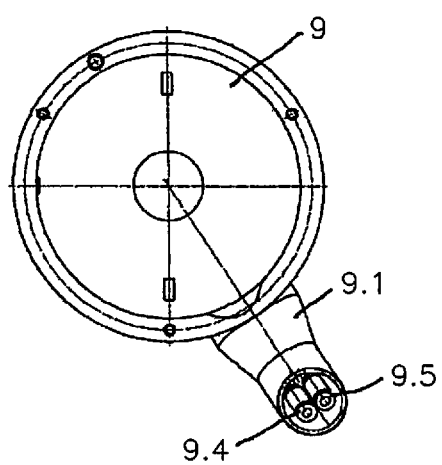
Figure 3C:
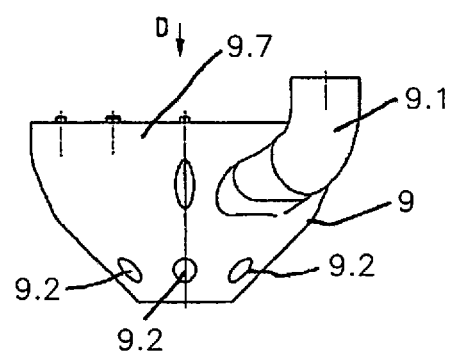

FIGS. 3A to 3C show a smoke extractor 9. Here, a nozzle-shaped cone 9.7 is fastenable to the housing 1 by a screw connection. An opening that tapers conically in the direction of a workpiece is formed in the cone 9.7, through which opening the outlet nozzle 2.1 with the wire-shaped material (3) and the three partial beams 6.1-6.3 can pass without them abutting the wall of the smoke extractor 9 and continuing to be exposed to protective gas.

Furthermore, perforations 9.2 are formed in the smoke extractor 9, in this example in the form of bores into which smoke formed during processing can be extracted and discharged by way of the extraction channel 9.1. The free cross-sectional areas of the perforations 9.2 and of the extraction channel 9.1 are dimensioned as explained in the general part of the description. The perforations 9.2 have the same free cross-sectional areas through which the smoke formed during processing can be extracted. Said perforations are arranged in a manner distributed at equal angular distances over the circumference of the smoke extractor 9.

A cooling channel 9.3 is also formed in the smoke extractor 9 and connected to a coolant feed 9.4 and to a coolant discharge 9.5. In this example, the coolant feed 9.4 and the coolant discharge 9.5 are guided through the extraction channel 9.1 such that they do not disturb and cannot be damaged from the outside. Here, too, the dimensioning information given in the general part of the description, which relates to the free cross-sectional areas, should be observed. The smoke extractor 9 is likewise made of copper or a copper alloy and can also be additively manufactured.

Figure 4A:
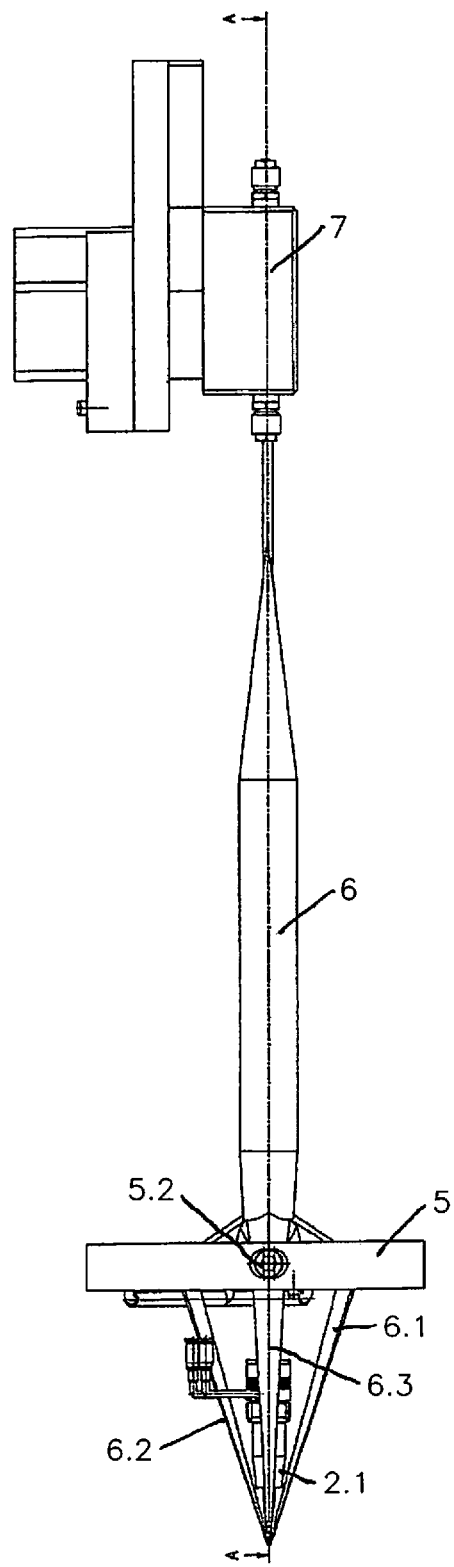
FIG. 4 consists of FIGS. 4A and 4B which show two illustrations with which the beam guiding of the laser beam, the three partial beams formed with said beam and the feeding of wire-shaped material should be rendered recognizable in exemplary fashion, and FIG. 5 consists of FIGS. 5A and 5B which show two views of an embodiment option in which wire-shaped material is feedable to an internal wire feed by a plurality of external wire feeds.
Figure 4B:
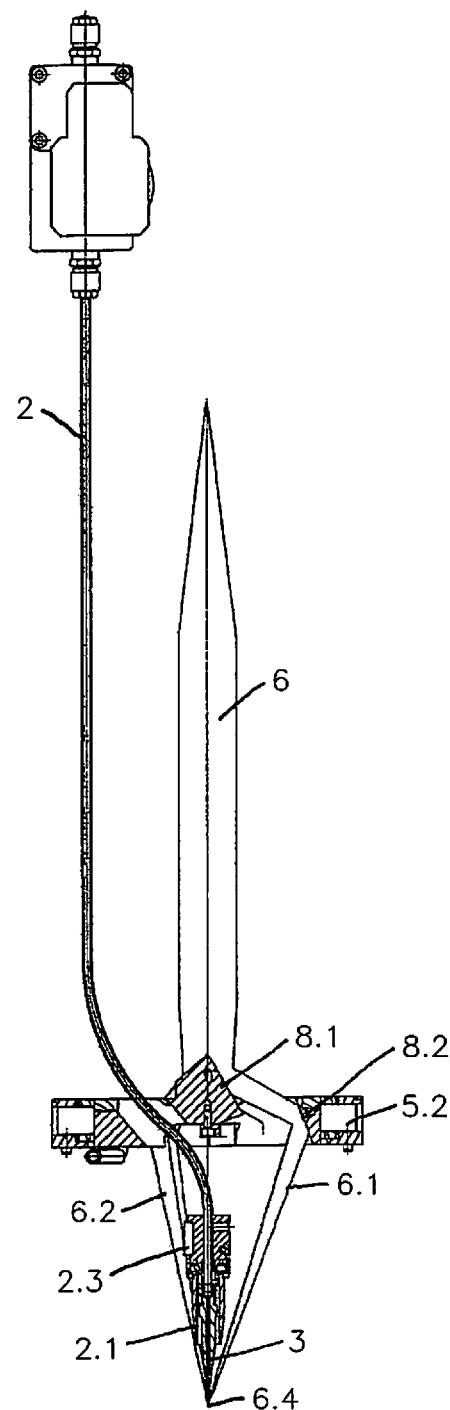

FIGS. 4A and 4B illustrate the advantageous guidance of the laser beam 6 with its partial beams 6.1-6.3 and the feeding of the wire-shaped material 3 by the internal wire feed 2.

In doing so, the focused laser beam 6 is incident on the three reflecting surfaces 8.1 of the pyramid-shaped element 8 and the three partial beams 6.1-6.3 obtained in the process are each reflected at a reflecting surface 8.2 formed at the optics carrier element 5.1. By means of the reflecting surfaces 8.2, the three partial beams 6.1-6.3 are aligned toward each other at an obliquely inclined angle such that they intersect 6.4 in a common plane. This plane 6.4 is arranged in the direction of a workpiece to be processed in front of the outlet opening of the outlet nozzle 2.1 from which the wire-shaped material 3 and protective gas for shielding the melt pool 2.4 exit, such that the wire-shaped material 3 is irradiated and heated uniformly from three sides by the three partial beams 6.1-6.3, such that uniform heating of the wire-shaped material 3 can be achieved on all sides, which leads to its complete melting in the irradiated area.

In the process, the wire-shaped material 3 is fed in the center of the three intersecting partial beams 6.1-6.3.

Figure 5A:
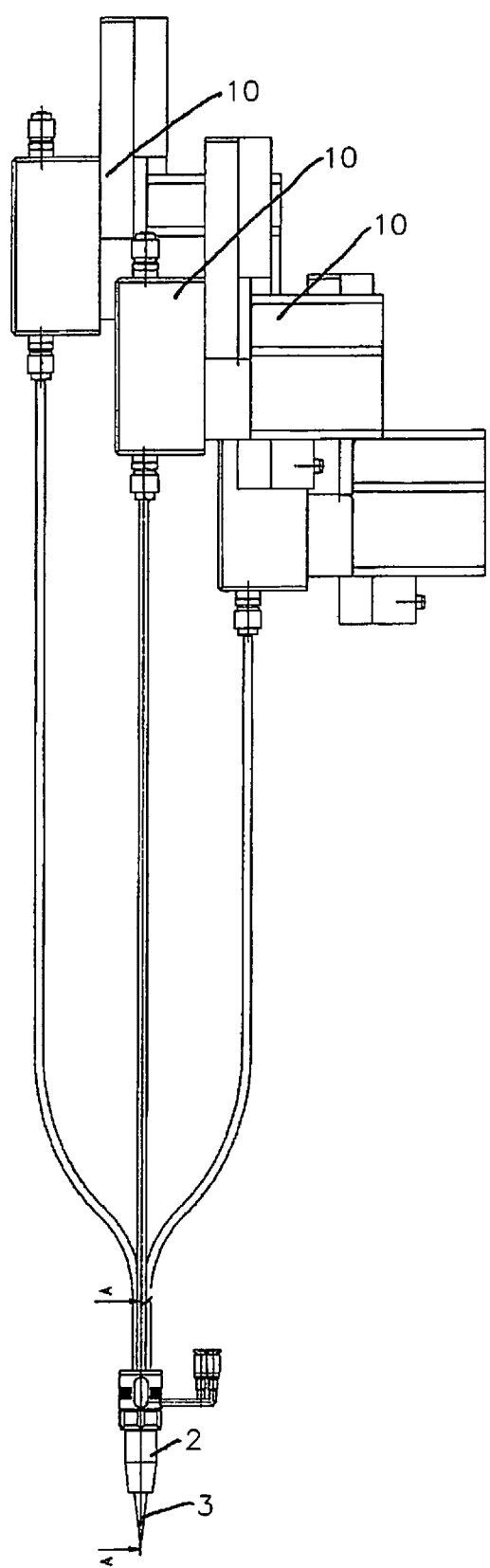
Figure 5B:
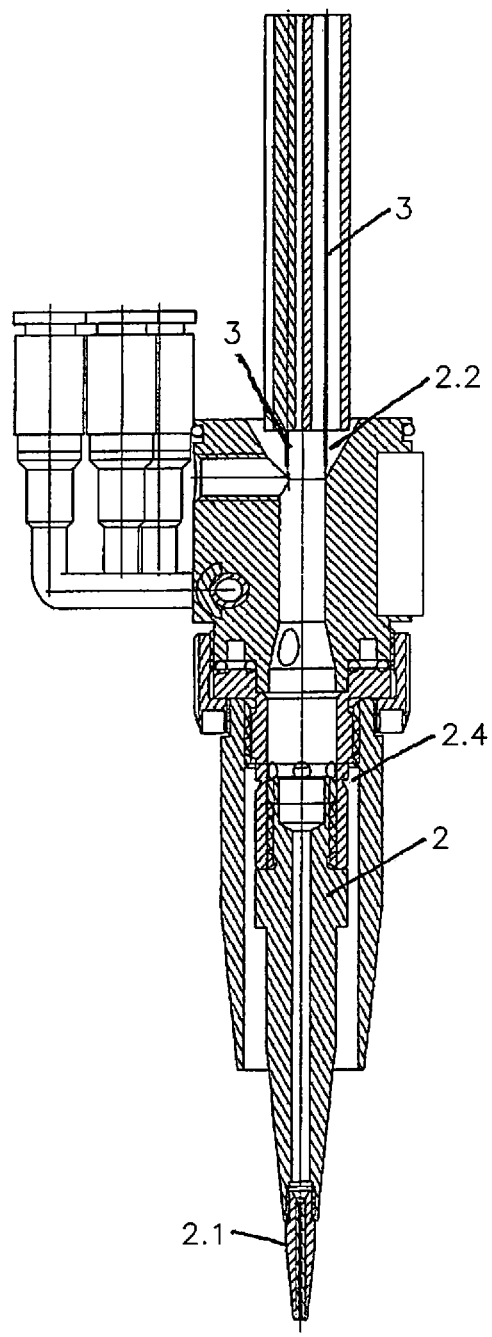

FIGS. 5A and 5B are intended to show the possibility of feeding different wire-shaped materials 3 or the possibility of using a plurality of external wire feeds 10, 11, 12 for an almost uninterrupted processing option when the same wire-shaped material 3 can be supplied by a plurality of external wire feeds 10, 11, 12.

The external wire feeds 10, 11, 12 are each formed with a dedicated drive for feeding the respective wire-shaped material 3. Said feeds can be activated one after the other in order to achieve a change in the fed wire-shaped material 3 or, when reaching the end of a wire-shaped material 3 of an external wire feed 10, 11, 12, to be able to switch to another external wire feed 10, 11, 12.

If there is a change from one external wire feed 10, 11, 12 to another, the wire-shaped material 3 conveyed by the subsequently activated external wire feed 10, 11, 12 is formed in the funnel-shaped area 2.2, which is arranged at the end side of the internal wire feed 2, which is located opposite the outlet nozzle 2.1. The newly fed wire-shaped material 3 can then be threaded into the bore, which is formed to reach as far as the outlet nozzle 2.1 for the wire-shaped material 3, with the aid of the funnel-shaped area 2.2, without any further measures or mechanism being required.

The invention claimed is:

1. A laser processing head for laser wire build-up welding, comprising:
   a housing configured to allow a laser beam to pass through;
   a pyramid-shaped element comprising at least three reflecting surfaces which are aligned at equal angular distances from each other, so that the laser beam is directed on the at least three reflecting surfaces to split into respective partial beams;
   an optics carrier element comprising reflecting surfaces arranged radially on an outside of the optics carrier element, wherein the reflecting surfaces of the optics carrier element are aligned such that the respective partial beams reflected at the reflecting surfaces they to intersect in a common plane;
   an internal wire feed is arranged in the housing, the internal wire feed having an outlet nozzle, arranged in the direction of a workpiece to be processed; and
   a wire-shaped materials fusible by using the energy of the respective partial beams incident on the wire-shaped material, the outlet nozzle is arranged in a feed movement of the wire-shaped material in front of the common plane in which reflected respective partial beams intersect;
   wherein the pyramid-shaped element is formed on the optics carrier element;
   wherein the optics carrier element is arranged and fixable in an optical adjustment element in such a way that the optics carrier element is displaceable following the outlet nozzle in two axes, which are perpendicular to an optical axis of the laser beam or perpendicular to a central longitudinal axis of the wire-shaped material for the optical adjustment element; and the optics carrier element is a monolith which is made of a single material and no individual part present on the optics carrier element is attached to the optics carrier element and the optics carrier element enables a central displacement element which permits movement perpendicular to the optical axis of the laser beam or perpendicular to the central longitudinal axis of the wire-shaped material by the optical adjustment element.

2. The laser processing head as claimed in claim 1, comprising at least one cooling channel and cooling grooves formed at or in the optics carrier element, the at least one cooling channel and cooling grooves are connectable to a feed and discharge for a cooling medium.

3. The laser processing head as claimed in claim 1, comprising the optics carrier element being adjustable in the two axes which are aligned perpendicularly to one another by two adjusting elements provided with threads and the adjusting elements are perpendicular to one another.

4. The laser processing head as claimed in claim 1, comprising a plurality of external wire feeds for feeding different wire-shaped materials and the wire-shaped material is feedable from each of the external wire feeds to the internal wire feed; and further comprising a funnel-shaped inlet opening for the introduction of the wire-shaped material from one of the external wire feeds into the internal wire feed is formed at an end side opposite the outlet nozzle.

5. The laser processing head as claimed in claim 1, comprising a smoke extractor on the housing, and an assembly unit on a side of the housing facing the workpiece.

6. The laser processing head as claimed in claim 5, wherein the smoke extractor having a plurality of perforations arranged around an outer circumference of the smoke extractor, which perforations open into a common extraction channel.

7. The laser processing head as claimed in claim 6, wherein a sum of free cross-sectional areas of the perforations through which smoke is extracted from a processing area of the workpiece corresponds to a free cross-sectional area of the common extraction channel, or is at most 10% larger or smaller than the free cross-sectional area of the common extraction channel, and thus a flow inlet and a flow outlet of the smoke extractor have substantially same cross-sections.

8. The laser processing head as claimed in claim 6, wherein the plurality of perforations configured to guide smoke into the common extraction channel and then into a circular tube which is fastened to an assembly unit for welding smoke extraction.

9. The laser processing head as claimed in claim 8, wherein the smoke extractor is nozzled-shaped, which is fastened to the housing and to the assembly unit and a wire adjustment element is formed with at least one cooling channel which is connected to a feed and a discharge for a cooling medium.

10. The laser processing head as claimed in claim 9, wherein the feed and the discharge are guided through the common extraction channel through the circular tube element of the assembly unit and a cross-sectional area required for the feed and the discharge is the same.

11. The laser processing head as claimed in claim 1, wherein the internal wire feed and the outlet nozzle being displaceable and lockable perpendicular to a plane in which the optics carrier element is displaceable and adjustable in two dimensions, for a defined positioning in relation to the common plane in which the reflected respective partial beams intersect.

* * * * *